United States Patent [19]
Meuth et al.

[11] Patent Number: 5,598,995
[45] Date of Patent: Feb. 4, 1997

[54] HIGH STRENGTH CLAMP ASSEMBLY WITH FLEXIBLE STRAPS AND METHOD OF USING SAME

[75] Inventors: Thomas L. Meuth; Charles A. Biggert, both of Spring, Tex.

[73] Assignee: Triad Metal Fabricators, Inc., Spring, Tex.

[21] Appl. No.: 528,318

[22] Filed: Sep. 14, 1995

[51] Int. Cl.$^6$ .................................................... F16L 3/08
[52] U.S. Cl. ..................... 248/74.3; 24/273; 24/306; 248/61; 248/219.4; 403/391
[58] Field of Search .......................... 248/74.3, 74.2, 248/73, 65, 61, 219.4; 24/273, 306, 442; 403/391, 389, 396

[56] References Cited

U.S. PATENT DOCUMENTS

| | | | |
|---|---|---|---|
| 4,397,436 | 8/1983 | Lyon et al. | 248/74.3 X |
| 4,854,015 | 8/1989 | Shaull | 248/74.3 X |
| 5,020,749 | 6/1991 | Kraus | 248/74.3 |
| 5,136,759 | 8/1992 | Armour, II | 24/306 X |

Primary Examiner—Ramon O. Ramirez
Attorney, Agent, or Firm—Pravel, Hewitt, Kimball & Krieger

[57] ABSTRACT

A clamp assembly and method for clamping an elongate member to a support member. The clamp assembly comprises a receptacle adapted to at least partially receive the elongate member, a pair of flexible support straps connected to the receptacle, and a pair of flexible clamping straps. The pair of flexible support straps are capable of matingly engaging one another around the support member and the pair of flexible clamping straps are capable of matingly engaging one another around the elongate member and the support member. The receptacle has a recess therein adapted to at least partially receive the elongate member. A pivotable buckle is attached to one of the flexible clamping straps for securely tensioning the pair of clamping straps around the elongate member and the support member. An adjustment assembly is attached to one of the flexible clamping straps. The adjustment assembly comprises an elastomeric adjuster attached to one of the flexible clamping straps and an adjustment patch attached to the elastomeric adjuster. The adjustment patch is capable of matingly engagingly one of the flexible clamping straps. The pairs of flexible support straps and flexible clamping straps engage with hook and loop type fasteners. A clamping tool is used to provide the leverage to pivot the buckle into the closed position.

20 Claims, 5 Drawing Sheets

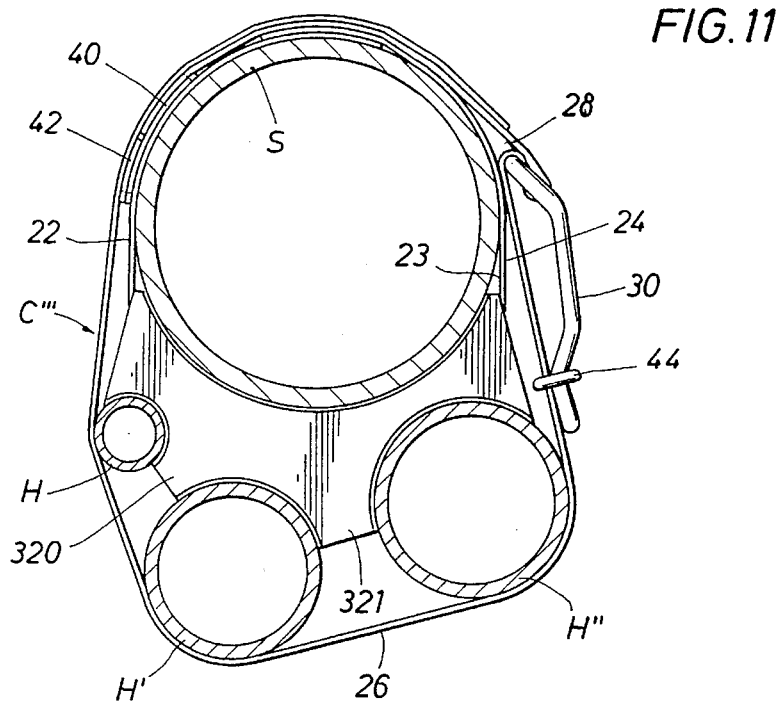
FIG. 11
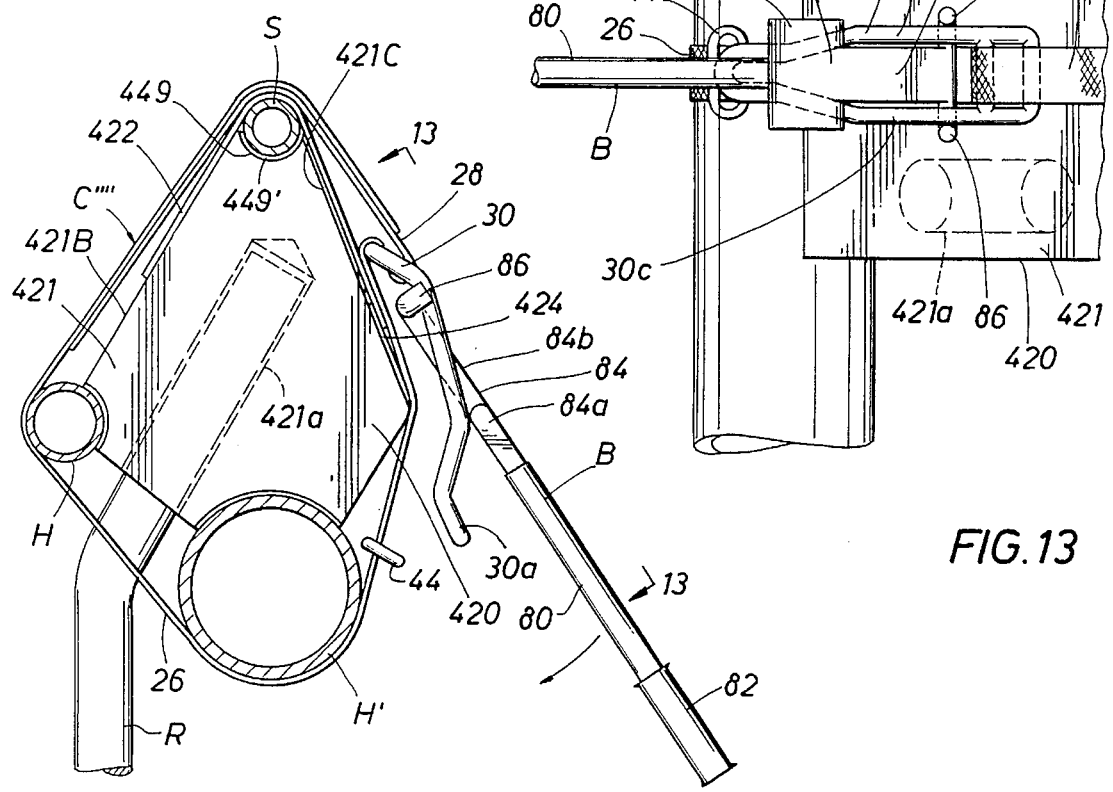
FIG. 12
FIG. 13

5,598,995

HIGH STRENGTH CLAMP ASSEMBLY WITH FLEXIBLE STRAPS AND METHOD OF USING SAME

SPECIFICATION

BACKGROUND OF THE INVENTION

1. Field of the Invention

The present invention relates generally to clamp assemblies for connecting one or more members to a support member, and more particularly to a clamp assembly to attach one or more pipes or lines, such as hydraulic, electric or pneumatic, to another pipe. The present invention is particularly adapted for use as a riser clamp assembly to attach various lines or pipes to a subsea riser.

2. Description of the Prior Art

The need often arises for a clamp assembly to attach a cable, hose or pipe to a support member or pipe. Typically, the cable, hose or pipe is run along the length of the support member or pipe. Many types of clamp assemblies have been used to secure the members to one another. The members may be horizontally positioned or vertically positioned. It is generally desirable that the clamp assembly be capable of quick installation while securely attaching the clamped members to one another. Additionally, it is desirable that the clamp assembly be lightweight and relatively inexpensive.

In the offshore drilling and production industry, it is frequently necessary to run hydraulic hose bundles and/or electrical cables or pipes hundreds and even thousands of feet below the support vessel or drilling or production platform down to the sea floor and beyond. Typically, the hydraulic hose bundle and/or electrical cables are required to be attached to a support member, such as a wireline cable or a subsea riser. Due to the high cost of working in such environments, it is critical that the clamp assembly be easy to install, quickly installed and reliable and dependable to firmly secure the clamped members. In the offshore industry, limited platform space is available for the workman to install the clamp assemblies and the workman is limited to accessing the riser from a single side. Thus, it is vitally important that the clamp assembly be easy to install from a location on one side of the riser.

In the past, riser clamps comprised of two half sections joined about the riser have been used. These riser clamps have been fabricated completely from steel. Such clamps are subject to rust and corrosion and add unwanted weight to the entire clamped assembly. Additionally, such clamps tend to be time consuming to install. Another type of riser clamp that has been used is similar to a large hose clamp which screws tight and directly clamps the clamped members to the support member. This type of clamp is subject to damaging the clamped members and is time consuming to install.

It is desirable to have a clamp assembly that is lightweight, easy to install, and capable of being quickly installed. It is also desirable that the clamp assembly be economical in addition to firmly securing the clamped members to one another. It is also desirable that the clamp assembly be adapted to be used within a casing. It is also desirable that the clamp assembly be capable of being used within a casing while also providing protection to the clamped members during their travel within the casing. It is further desirable that the clamp assembly be adapted to be used with a support member comprising a cable in addition to a riser pipe. The clamp assembly should also provide protection against abrasion at the contact points with the clamped members. Additionally, the tools required to install the clamp assembly should be lightweight and easy to use.

SUMMARY OF THE INVENTION

The present invention is a high strength clamp assembly utilizing flexible straps to securely clamp the members to one another. The high strength clamp assembly is lightweight, easy to install, and capable of being quickly installed. The clamp assembly is economical and firmly secures the clamped members to one another.

The clamp assembly includes a receptacle adapted to at least partially receive the elongate member, a pair of flexible support straps connected to the receptacle, and a pair of flexible clamping straps. The pair of flexible support straps are capable of matingly engaging one another around a support member and the pair of flexible clamping straps are capable of matingly engaging one another around one or more elongate members and the support member. The receptacle includes a receptacle body made of high density polyurethane foam having a recess therein adapted to at least partially receive the elongate member.

A pivotable buckle is attached to one of the flexible clamping straps for securely tensioning the pair of clamping straps around the elongate member or members and the support member. An adjustment assembly is attached to one of the flexible clamping straps. The adjustment assembly comprises an elastomeric adjuster attached to one of the flexible clamping straps and an adjustment patch attached to the elastomeric adjuster. The adjustment patch is capable of matingly engagingly one of the flexible clamping straps. The pairs of flexible support straps and flexible clamping straps engage with hook and loop type fasteners.

The clamp assembly can be used within a casing and also provides protection to the clamped members during their travel within the casing. The high strength clamp assembly can also be used to clamp elongate members to a support member comprising a small diameter cable. The clamp assembly provides protection against abrasion at the contact points with the clamped members.

The clamp assembly is installed by securing the clamp assembly to the support member and then loosely securing the support member and the elongate member or members to the receptacle by matingly engaging one of the flexible clamping straps to the adjustment assembly. The pair of flexible clamping straps are pretensioned prior to matingly engaging the pair of flexible clamping straps. The final tensioning of the pair of flexible clamping straps is accomplished with a clamping tool.

The clamping tool is used to apply leverage to the pivotable buckle having a pair of substantially parallel buckle bars. The clamping tool includes a shank having a plate member attached to a first end of the shank. The plate member has a first portion and a second portion. The first portion has a width greater than the distance between the buckle bars and the second portion has a width less than the distance between the buckle bars. A pair of end extensions extend from the second portion of the plate member.

BRIEF DESCRIPTION OF THE DRAWINGS

In order to more fully understand the drawings referred to in the detailed description of the present invention, a brief description of each drawing is presented, in which:

FIG. 11 is a top plan view of an embodiment similar to the first embodiment of the high strength clamp assembly shown clamping three elongate members to a support member;

FIG. 12 is a top plan view of third embodiment of the high strength clamp assembly showing two elongate members being attached to a cable with a clamping tool and a reactor bar; and FIG. 13 is a view taken along line 13—13 of FIG. 12 with the reactor bar removed.

DETAILED DESCRIPTION OF PREFERRED EMBODIMENT

Figure 4:
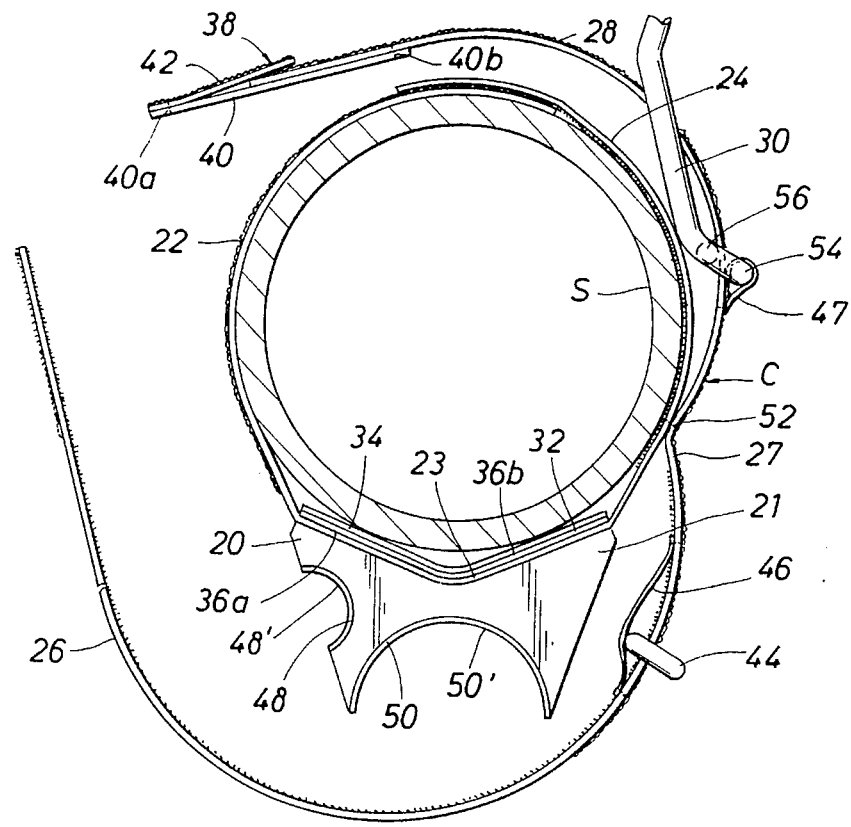
FIG. 4 is a top plan view of the first embodiment of the high strength clamp assembly showing the clamp assembly attached to the support member.

Referring now to the drawings in greater detail, the high strength clamp assembly with flexible straps of the present invention, generally designated by the letter C, is shown in a first embodiment in FIGS. 1–7. The high strength clamp assembly C, comprises a receptacle 20, first and second mating support straps 22 and 24, respectively, first and second mating clamping straps 26 and 28, respectively and a buckle 30 as best shown in FIG. 4.

Referring to FIGS. 2–7, the receptacle 20 includes a rigid backing member 32 having a rubber layer 34 attached to the backing member 32. The rubber layer 34 provides non-abrasive contact with a support member S to which it is attached during use of the clamp assembly C. The rigid backing member 32 is shown in FIGS. 2 and 4–7 as having two planar sections 36a and 36b joined to form an oblique angle. The configuration of the rigid backing member 32 allows for secure fixation to the support member S over a predetermined range of outside diameters of the support member S.

Referring to FIG. 4, the first and second mating support straps 22 and 24 are preferably flexible straps made of webbing 23 and having preferably hook and loop type fasteners attached thereto. The first and second mating clamping straps 26 and 28 are also preferably flexible straps made of webbing 27 and having preferably hook and loop type fasteners attached thereto. Preferably, the hook and loop type fasteners used in the first and second mating support and clamping straps 22, 24 and 26 and 28, respectively, are VELCRO products. VELCRO is the registered trademark of Velcro U.S.A., Inc. Preferably, the mating straps 22, 24, 26 and 28 are made of polyester due to its improved properties when exposed to ultraviolet light, alkali, acids and salt water. Thus, the flexible webbing straps 23 and 27 are preferably made of polyester. The preferred VELCRO product used as the hook portion is VELCRO Ultra-Mate Brand HTH 704, which is made of polyester, has high strength and a high cycle life. The preferred VELCRO product used as the loop portion is VELCRO Ultra-Mate Brand RGL 009, which is also made of polyester, has high strength and a high cycle life. This hook and loop combination has a rated life of 10,000 fastenings/unfastenings.

For purposes of describing the invention, it is to be understood that the support strap 22 is always to be preferably of the hook type fastener and the support strap 24 is always to be preferably of the loop type fastener. It is also to be understood that the clamping strap 28 is always to be preferably of the hook type fastener and the clamping strap 26 is always to be preferably of the loop type fastener.

Referring to FIG. 4, there is an adjustment assembly 38 comprised of an adjustment patch 42 and an elastomeric adjuster 40 which is preferably made of natural latex rubber. The adjustment patch 42 is joined, preferably by stitching, to the elastomeric adjuster 40 at 40a. The elastomeric adjuster 40 is attached, preferably by stitching, to the clamping strap 28 at 40b. The adjustment patch 42 is made of the same polyester material and also has the same hook-type fastener as the clamping strap 28.

Figure 2:
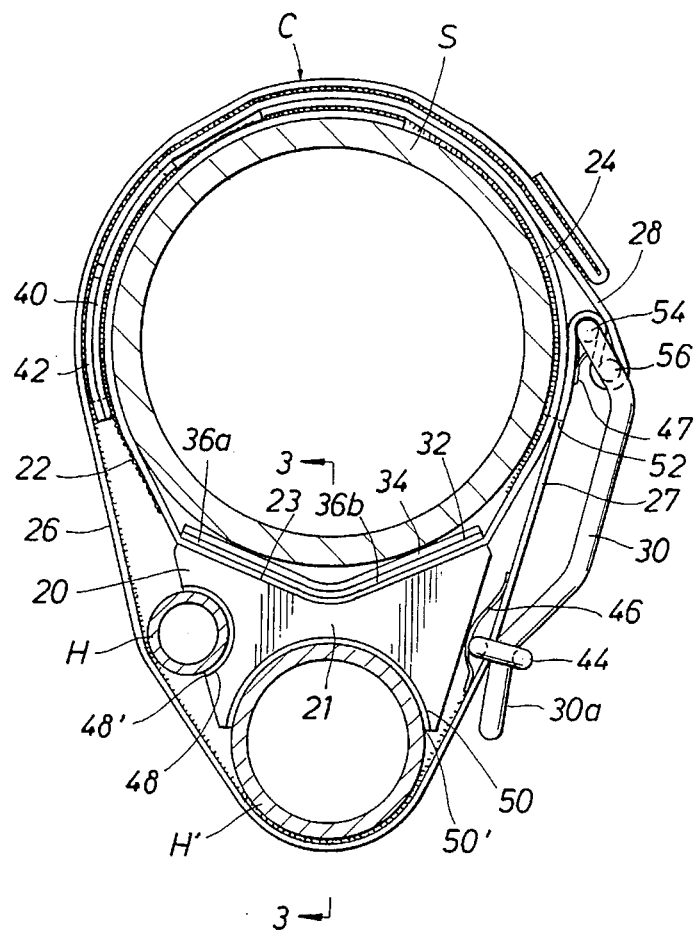
FIG. 2 is an enlarged sectional view taken along line 2—2 of FIG. 1.
Figure 3:
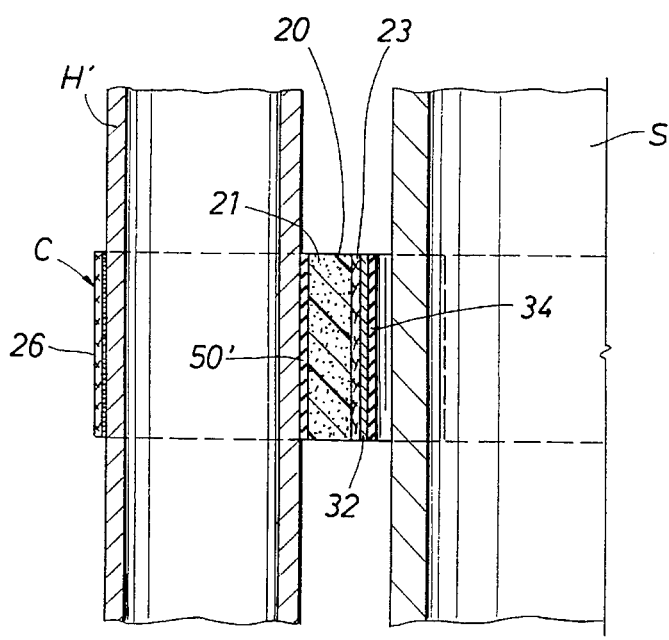
FIG. 3 is a sectional view taken along line 3—3 of FIG. 2.

Referring to FIGS. 2 and 4, a ring 44 is provided on the first clamping strap 26 to secure the outermost portion 30a of the buckle 30 when the clamp assembly C is securably installed. A ring retaining strap 46 maintains the ring 44 at the proper location on the first clamping strap 26. A buckle retaining strap 47 secures the location of the buckle 30 on the first clamping strap 26.

The buckle 30 includes a pivot bar 54 and a tightener bar 56. The pivot and tightener bars 54 and 56, respectively, are substantially parallel to one another and spaced a predetermined distance apart. Referring to FIG. 4, the second clamping strap 28 extends through the space between the pivot bar 54 and the tightener bar 56 for reasons which will be explained below.

Referring to FIG. 4, the receptacle 20 includes one or more recesses 48 and 50 in a receptacle body 21. Preferably, the recesses 48 and 50 include a rubber insert layer 48' and 50', respectively. The rubber insert layers 48' and 50' provide a non-abrasive surface to contact the clamped elongate members H and H' as shown in FIGS. 2, 3 and 5–7.

It is to be understood that the recesses 48 and 50 with the rubber insert layers 48' and 50' substantially correspond with the outer shape of the elongate members H and H', respectively, to form a close-fitting reception of the elongate members H and H' with the receptacle 20. Typically, the outer shape of the elongate members H, H' is circular and the recesses 48, 50 are arcuate. Preferably, the arcuate recesses 48, 50 comprise an arc no greater than 180° to allow the elongate members H and H' to be slipped therein. The close-fitting reception and the rubber insert layer 48', 50' improve the holding ability of the elongate members H, H' to the clamp assembly C.

It is also to be understood that the location of the recesses 48, 50 will vary depending on the size and quantity of the elongate members being clamped to the clamp assembly C. The actual placement of the recesses 48, 50 requires that the first clamping strap 26 makes firm contact with each of the elongate members H, H' when the clamp assembly C is installed as will be explained in greater detail below.

Preferably, the body 21 of the receptacle 20 is substantially rigid and lightweight. The receptacle body 21 is preferably made out of a high density, polyurethane foam which is easily made into the desired shape. The high density polyurethane foam is substantially rigid, durable, lightweight and is convenient and inexpensive to use in forming the receptacle body 21.

Referring to FIG. 4, the first and second support straps 22 and 24, respectively, are preferably formed of one continuous flexible webbing strap 23 passing between the receptacle body 21 and the rigid backing member 32. The hook and loop fasteners are attached to appropriate surfaces of the webbing strap 23, preferably with polyester stitching, to form the first and second support straps 22 and 24, respectively. For the reasons explained above, preferably the webbing strap 23 is also made of polyester. The rigid backing member 32, continuous flexible strap making up the first and second support straps 22 and 24, and the receptacle body 21 are securely attached together, preferably, bonded together with a rubberized epoxy which can withstand the environment in which the clamp assembly C is to be used. For example, if the clamp assembly C is intended for subsea use, the bonding material should be suitable for use in saltwater. One such bonding material suitable for saltwater use is 2216 Gray, an epoxy mix available from the 3M Company.

Referring to FIG. 4, the first and second clamping straps 26 and 28, respectively, are preferably formed of one continuous flexible webbing strap 27. The hook and loop fasteners are attached to the appropriate surfaces of the webbing strap 27, preferably with polyester stitching, to form the first and second clamping straps 26 and 28, respectively. The webbing strap 27 is attached to the clamp assembly C by stitching the webbing strap 27 to the webbing strap 23 of the second support strap 24. The stitches 52 are shown in FIGS. 2 and 4–7.

The installation of the clamp assembly C will now be described in detail with reference to FIGS. 1–7. Referring to FIG. 4, the first and second support straps 22 and 24, respectively, are wrapped around the support member S. The rubber layer 34 attached to the rigid backing member 32 is positioned against the support member S. The first and second support straps 22 and 24, respectively, are then fastened to one another to form a snug fit around the support member S.

Figure 5:
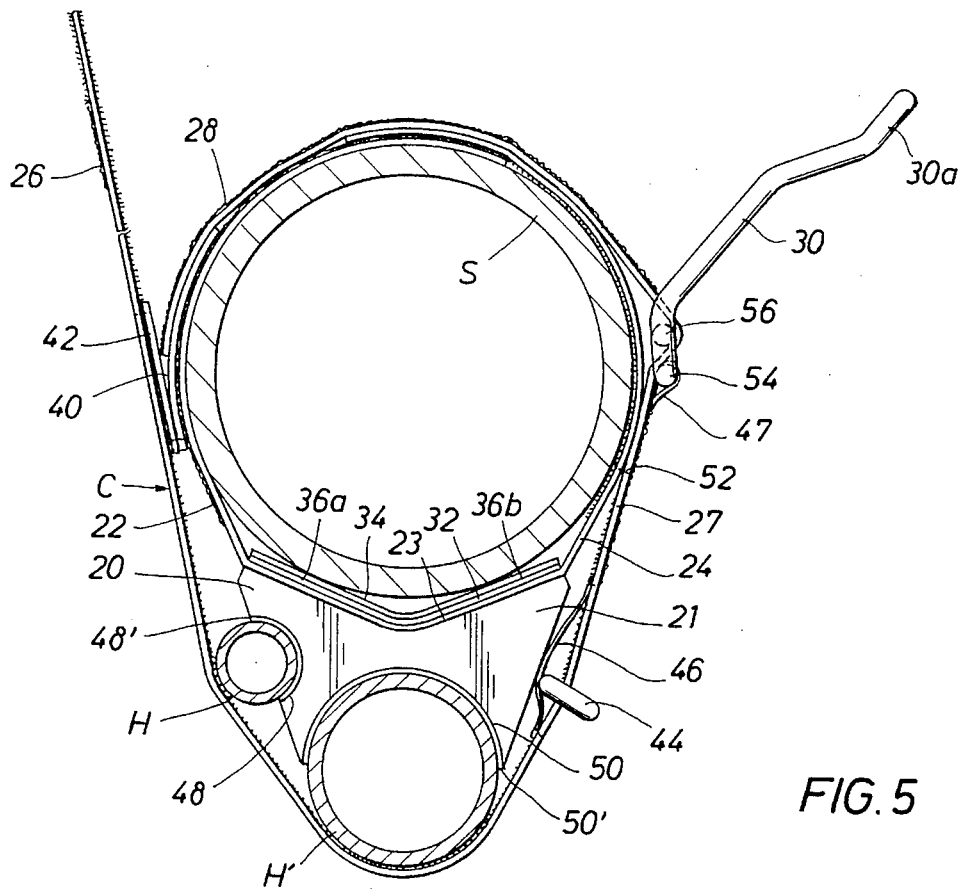
FIG. 5 is a view similar to FIG. 4 and showing an initial step of attaching two elongate members to the high strength clamp assembly.
Figure 6:
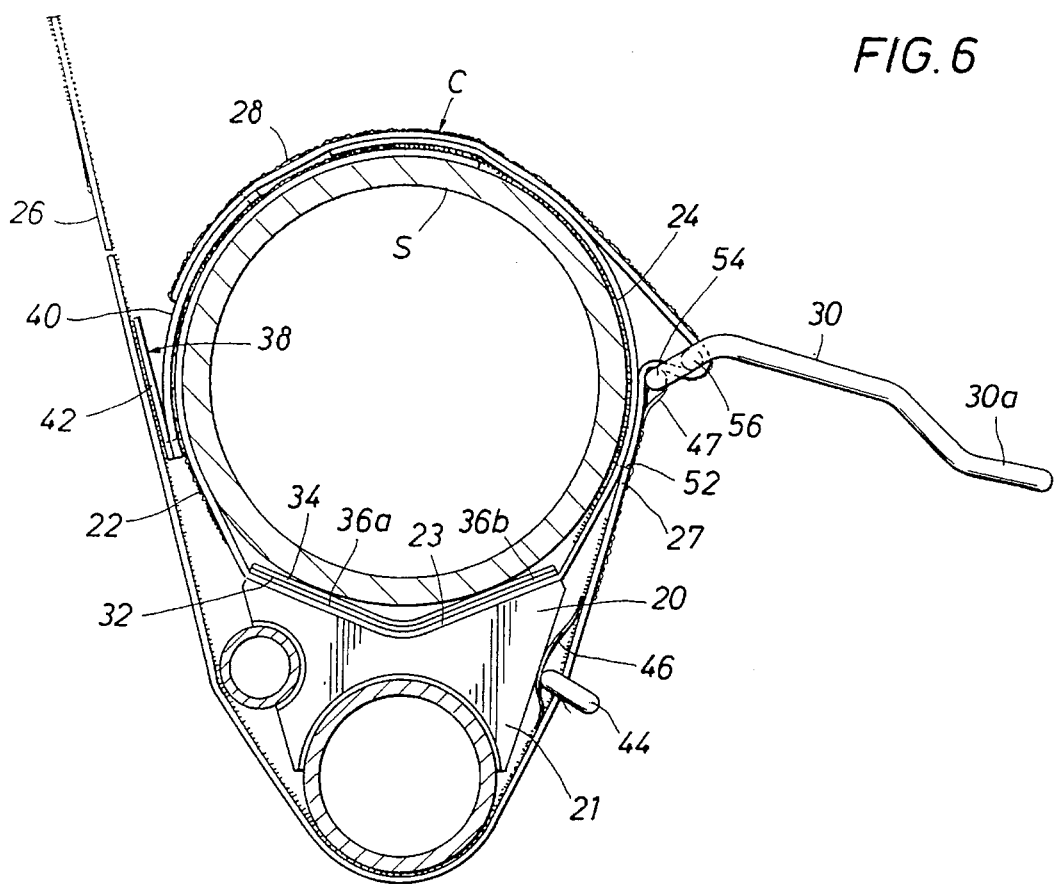
FIG. 6 is a view similar to FIG. 5 and showing a second step of gauging the appropriate clamping strength with the adjustment patch.

Referring to FIG. 5, the elongate members H and H' are positioned within the recesses 48 and 50, respectively. The second clamping strap 28 is extended around the support member S with the mated support straps 22 and 24 therebetween. The first clamping strap 26 is positioned around the elongate members H and H' and brought into mating engagement with the adjustment patch 42 with the buckle 30 in the substantially opened position as shown in FIG. 5. The buckle 30 is rotated to a position wherein the outermost portion 30a of the buckle 30 is approximately aligned through the center of the support member S as shown in FIG. 6. As the buckle 30 is rotated to the position as shown in FIG. 6, the elastomeric adjuster 40 is allowed to stretch with the adjustment patch 42 matingly engaged with the first clamping strap 26.

Figure 1:
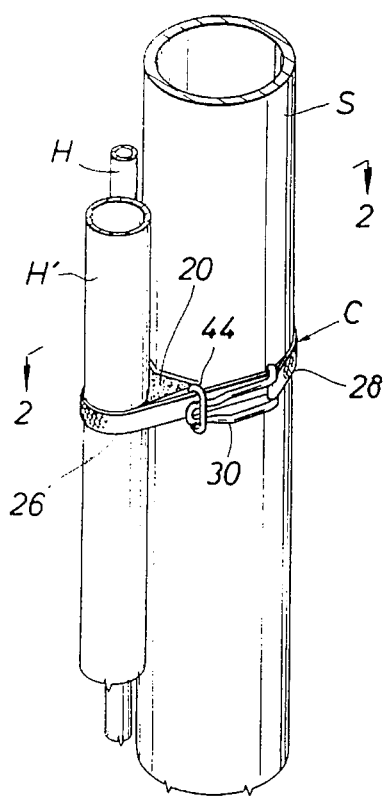
FIG. 1 is a partial elevational view of a first embodiment of the high strength clamp assembly shown clamping two elongate members to a support member.
Figure 7:
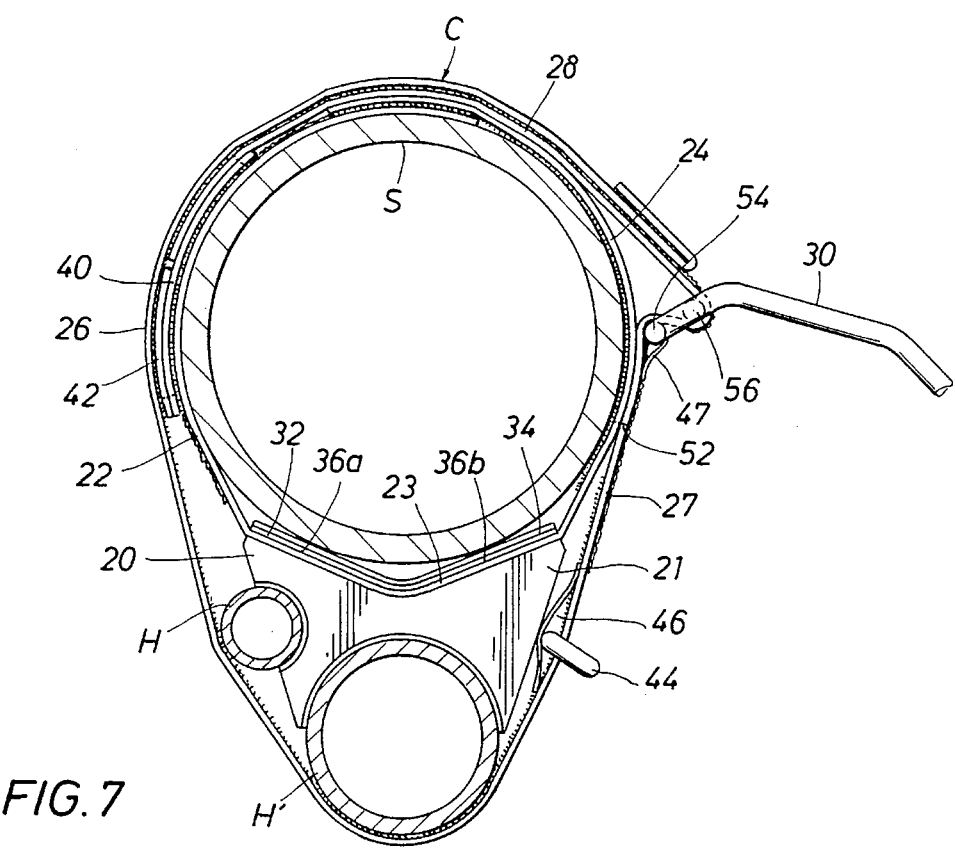
FIG. 7 is a view similar to FIG. 6 and showing a third step of attaching the pair of mating clamping straps to one another.

With the buckle 30 maintained in the position as shown in FIG. 6, the remaining portion of the first clamping strap 26 is matingly engaged with the second clamping strap 28 as shown in FIG. 7. The buckle 30 is then further rotated about its pivot bar 54 to its closed position. The second clamping strap 28 extends between the pivot bar 54 and the tightener bar 56 of the buckle 30 so that as the buckle 30 is rotated to the closed position about the pivot bar 54, the second clamping strap 28 serpentinely wraps around the pivot and tightener bars 54 and 56, respectively, to thus securely draw taut the clamping straps 26 and 28 around the support member S and the elongate members H and H' as shown in FIG. 2. The ring 44 is then extended over the end portion 30a of the buckle 30 as shown in FIGS. 1 and 2. The ring 44 insures that the buckle 30 does not accidentally open during use.

The adjustment assembly 38 is unique and vital in providing the ability to quickly and accurately install the clamp assembly C in an offshore environment, as well as any other environment where speed and accuracy of tensioning are required. The adjustment assembly 38 allows the workman to pre-adjust the tension between the clamping strap 26 and the clamping strap 28 before actually fastening them together in a fixed relationship as described above. Once the tension is pre-adjusted by rotating the buckle 30 to the proper position as shown in FIG. 6, and the clamping straps 26 and 28 are mated, the workman then rotates the buckle 30 with his right hand to take up the remaining slack in the clamping straps 26 and 28. Normally, this will produce the proper tensioning, since the buckle 30 was designed such that the amount of strap take-up in the buckle 30, when the buckle 30 is in the position as shown in FIGS. 6 and 7, is enough to securely clamp the clamping straps 26 and 28 about the support member S and the elongate members H and H' if the adjustment assembly 38 was put in tension by rotating the buckle 30 to the position shown in FIG. 6.

However, if the workman realizes that he has too little or too much tension on the straps 26 and 28 the readjustment process is greatly simplified. To accomplish this he continues to hold a small amount of tension on the buckle 30 with his right hand, and then he pulls the clamping strap 26 away from its mating with the clamping strap 28 but only to where the adjustment patch 42 is mated to clamping strap 26. He then once again judges the proper rotation of the buckle 30, and once again mates clamping strap 26 with clamping strap 28 as shown in FIG. 6, and finally rotates the buckle 30 to its joining with the retaining ring 44. The entire readjustment process would normally take about three to five seconds to accomplish. After assembling only a few of the clamp assemblies C to the support member S, the workman can consistently clamp them quickly and accurately without having to readjust the tensioning.

Without the adjustment assembly 38, the workman would have to readjust more often than not because he would always be guessing where to make the initial joining of the two clamping straps 26 and 28 together. Also, any time that readjustment was necessary, it would require a much greater time (minutes not seconds) because the workman would have to pull both straps 26 and 28 completely apart which disorients the flexible straps 26 and 28, and then the workman must start over from scratch which once again requires both hands and involves a guess as to where to rejoin the straps 26 and 28. This process may have to be repeated several times to get the proper tension on just one clamp assembly C.

Figure 8:
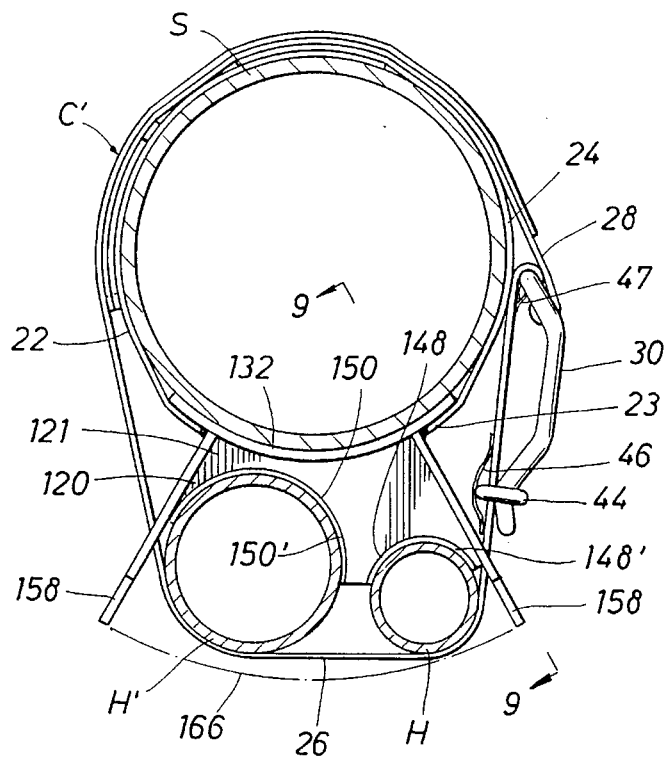
FIG. 8 is a top plan view of a second embodiment of the high strength clamp assembly shown clamping two elongate members to a support member and adapted for use within a casing.
Figure 9:
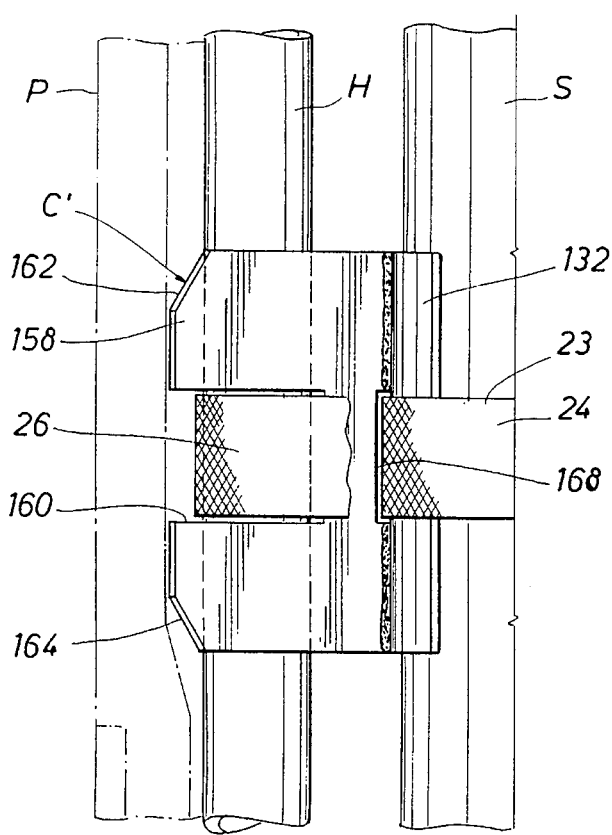
FIG. 9 is a sectional view taken along line 9—9 of FIG. 8.

FIGS. 8 and 9 show a second embodiment of the clamp assembly, generally designated as C'. The clamp assembly C' is designed for use within a casing P.

It is to be understood that components which have been modified in the clamp assembly C' will be designated with the like two digit reference numeral used above in describing the clamp assembly C of the first embodiment but preceded with a "1".

The support straps 22 and 24, the clamping straps 26 and 28, and the buckle 30 with ring 44 are all constructed in the same manner and from the same materials as described above in the first embodiment of the clamp assembly C. The same type of adjustment assembly 38 is used in the second embodiment as was described in the first embodiment.

Referring to FIG. 8, the receptacle 120 has been modified from the receptacle 20 of the clamp assembly C. The receptacle 120 includes a rigid backing member 132 having a rubber layer (not shown) attached thereto. The rubber layer provides non-abrasive contact with the support member S to which it is clamped during use of the clamp assembly C'. The rigid backing member 132 is shown in FIG. 8 as having an arcuate shape corresponding with the outer diameter of the support member S. The receptacle body 121 includes recesses 148 and 150 therein. Preferably, the recesses 148 and 150 include a rubber insert layer 148' and 150', respectively, to provide a non-abrasive surface in contact with the elongate members H and H' as shown in FIG. 8.

The receptacle 120 includes a pair of fins 158 extending substantially radially outward from the rigid backing member 132. The receptacle body 121 is formed between the pair of fins 158 and the rigid backing member 132.

Referring to FIG. 9, the fins 158 have a notched portion 160 at least as great as the width of the clamping straps 26 and 28 and deep enough so as not to interfere during the clamping operation. Preferably, the fins 158 are tapered or rounded at the upper and lower outer extremities 162 and 164, respectively, for reasons which will be explained below. The fins 158 extend outwardly from the rigid backing member 132 a length sufficient such that an arc formed about the center line of the support member S and passing through the outer extremities of the fins 158 is beyond the clamping strap 26 and the elongate members H and H'. This insures that as the clamp assembly C' is lowered or raised within a casing P, the fins 158 protect the elongate members H and H' from being compressed against the wall of the casing P. Often times, the wall thickness of the casing P changes at various depths or intervals. The tapered ends 162 and 164 prevent the clamp assembly C' from getting hung up at a wall thickness transition as shown in FIG. 9. The fins 158 also serve to protect the clamped elongate members H and H' from being damaged at the wall thickness transitions.

Referring to FIG. 9, the fins 158 each include a recess 168 through which the continuous flexible webbing 23 of the support straps 22 and 24 may pass. The fins 158 are rigidly secured to the rigid backing member 132, as for example by welding. The rigid backing member 132, continuous flexible strap 23 making up the first and second support straps 22 and 24, and the receptacle body 21 are securely attached together, preferably, bonded together with a rubberized epoxy which can withstand the environment in which the clamp assembly C' is to be used.

Figure 10:
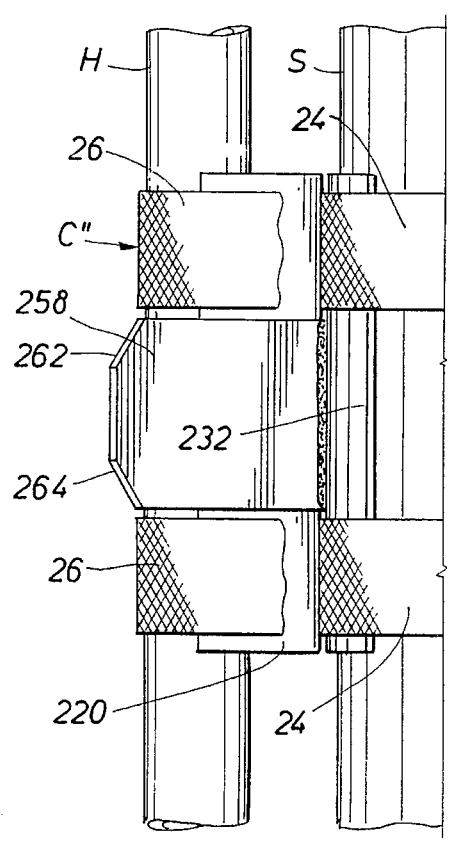
FIG. 10 is a view similar to FIG. 9 showing an alternate embodiment of the high strength clamp assembly adapted for use within a casing having a pair of mating clamping straps.

FIG. 10 shows a clamp assembly C" which is an alternate embodiment of the clamp assembly C'. It is to be understood that components which have been modified in the clamp assembly C" will be designated with a "2" for the first digit with the second and third digits being the same as used in describing the first and second clamp assemblies C and C'.

The clamp assembly C" is very similar the clamp assembly C' in that it incorporates a pair of fins 258 for usage within a pipe as described above. In the alternate embodiment C", the pair of fins 258 are substantially centrally located between the upper and lower ends of the receptacle 220 and two pairs of mating support straps (not shown) and two pairs of mating clamping straps 24 and 26 are utilized.

The pair of fins 258 are preferably welded to the rigid backing member 232. Preferably, the fins 258 are tapered or rounded at the upper and lower outer extremities 262 and 264, respectively, for reasons as explained above. The fins 258 extend outwardly from the rigid backing member 232 a length sufficient such that an arc (not shown) formed about the center line of the support member S and passing through the outer extremities of the fins 258 is beyond the clamping straps 26 and the elongate members.

It is anticipated that the alternate clamp assembly C" be used where it is desirable to have two independent clamping assemblies provided in a single clamp. It is also to be understood that this type of clamp assembly C" could also be made without the pair of fins 258 if desired.

Referring to FIG. 11, another embodiment of the clamp assembly C, designated generally as C''' is shown. The clamp assembly C''' is designed for clamping three elongate members H, H' and H" to the support member S. It is to be understood that the clamp assembly C''' is similar in all respects to the clamp assembly C with the exception of the receptacle 320.

The receptacle 320 is shaped and formed to correspond to the size and number of elongate members being clamped to the support member S. The exact configuration of the receptacle 320 and the receptacle body 321 will be determined based on the size and quantity of elongate members. Thus, it is to be understood that the configurations of the receptacles in the various embodiments are merely for illustrative purposes and changes in the size and shape may be made without departing from the scope of the invention.

Referring to FIGS. 12 and 13, a third embodiment of the clamp assembly C"" is shown. The clamp assembly C"" is intended to be used when it is desired to clamp one or more elongate members H and H' to a cable S, such as a braided cable as is often used as a wireline cable, or a small diameter support member.

The first and second mating support straps 422 and 424 and the receptacle 420 are modified in the clamp assembly C"" as a result of the small diameter cable which is the support member S. The receptacle body 421 of the receptacle 420 includes an arcuate recess 449 and a rubber insert layer 449' to provide a non-abrasive surface in contact with the support member S.

Referring to FIGS. 12 and 13, the receptacle body 421 includes a bore 421a therein for slidably receiving a reactor bar R (FIG. 12) as will be described below.

Referring to FIG. 12, the first mating support strap 422 is preferably securely attached to a first face 421b of the receptacle body 421 adjacent the arcuate recess 449. The second mating support strap 424 is preferably securely attached to a second face 421c of the receptacle body 421 adjacent the arcuate recess 449. The first and second mating support straps 422 and 424, respectively, include hook and loop type fasteners attached thereto as previously described for the other embodiments.

Although not shown in FIGS. 12 and 13, the same adjustment assembly is utilized with the clamp assembly C"" as was previously described. It is to be understood that the same adjustment assembly is utilized with all of the embodiments and variations described above.

Briefly, the installation of the clamp assembly C"" will now be described with reference to FIGS. 12 and 13. The second support strap 424 is extended around the support member S seated in the arcuate recess 449 prior to matingly engaging the first support strap 422. The engaged first and second support straps 422 and 424, respectively, form a snug fit around the support member S.

Referring to FIG. 12, the elongate members H and H' are positioned within their respective recesses. The second clamping strap 28 is extended around the support member S with the mated support straps 422 and 424 therebetween. The first clamping strap 26 is positioned around the elongate members H and H' and brought into mating engagement with the adjustment strap (not shown) as previously described.

The reactor bar R can be inserted into the bore 421a to prevent the clamp assembly C"" from rotating about the support member S during the pivoting of the buckle 30 from the open to the closed position. As shown in FIGS. 12 and 13, a clamping tool B is adapted to releasably connect with the buckle 30 to provide additional leverage and force to close the buckle 30. The clamping tool B and the reactor bar R are removed upon final installation of the clamp assembly C"".

Referring to FIGS. 12 and 13, the clamping tool B includes an elongated shank 80 having a handgrip 82 at one end and terminating at a second end with a plate member 84. The plate member 84 includes a first portion 84a having a width approximately the width of the buckle 30 or greater and a second portion 84b having a width less than the distance between the buckle bars 30b and 30c as shown on FIG. 13. The end of the second portion 84b of the plate member 84 includes a pair of up-turned L-shaped rods 86 wherein the distance between the up-turned portions of the L-shaped rods 86 is greater than the outer distance between the buckle bars 30b and 30c. The width transition of the first portion 84a to the second portion 84b of the plate member 84 forms a bearing surface with the upper surface of the buckle 30 and the L-shaped rods 86 form a bearing surface with the lower surface of the buckle 30 as shown in FIG. 12. This enables the clamping tool B to be used as a lever to pivot the buckle 30 into the clamped position. The up-turned rods 86 and the plate member 84 are in contact with the buckle bars 30b and 30c which allows the clamping tool B to align the end portion 30a of the buckle 30 with the ring 44.

It is to be understood that the clamping tool B can be used with any of the clamping assemblies described herein. It has been found that a tensile pull in the range of approximately 1,000 to 2,000 pounds can be exerted on the clamping straps which far exceeds the minimum required force of approximately 300 pounds often required in subsea applications involving risers, umbilicals, hydraulic hoses, and electrical cables.

One fear in the drilling industry is the dropping of a clamp assembly in the casing or the wellbore hole. An advantage of the high strength clamp assembly of the present invention is that it can be fished out of the hole if dropped without the necessity of pulling entirely out of the hole.

It is to be understood that the high strength clamp assembly of the present invention is very versatile and has applications in many fields. It is not intended to be limited to the drilling industry, but could be used in virtually any situation requiring the clamping of one or more elongate members to a support member.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A clamp assembly for clamping an elongate member to a support member, the clamp assembly comprising:
    a receptacle adapted to at least partially receive the elongate member;
    a pair of flexible support straps connected to said receptacle, said pair of flexible support straps capable of matingly engaging one another around the support member; and
    a pair of flexible clamping straps capable of matingly engaging one another around the elongate member and the support member.

2. The clamp assembly of claim 1, wherein said receptacle has a recess therein, said recess adapted to at least partially receive the elongate member.

3. The clamp assembly of claim 1, further comprising means for securely tensioning said pair of clamping straps around the elongate member and the support member.

4. The clamp assembly of claim 3, wherein said means for securely tensioning comprises a pivotable buckle attached to one of said pair of flexible clamping straps.

5. The clamp assembly of claim 3, further comprising an adjustment assembly attached to one of said pair of flexible clamping straps.

6. The clamp assembly of claim 5, wherein said adjustment assembly comprises:
    an elastomeric adjuster attached to one of said pair of flexible clamping straps; and
    an adjustment patch attached to said elastomeric adjuster, said adjustment patch capable of matingly engagingly one of said pair of flexible clamping straps.

7. The clamp assembly of claim 1, wherein said pair of flexible support straps and said pair of flexible clamping straps engage with hook and loop type fasteners.

8. The clamp assembly of claim 1, wherein said receptacle includes a receptacle body made of polyurethane foam.

9. The clamp assembly of claim 1, wherein said pair of flexible clamping straps are connected to one of said pair of flexible support straps.

10. The clamp assembly of claim 1, further comprising a pair of fins extending outwardly from said receptacle.

11. A clamp assembly for clamping one or more elongate members to a support member, the clamp assembly comprising:
    a receptacle adapted to at least partially receive the elongate members;
    a pair of support straps connected to said receptacle, said pair of support straps capable of engaging one another around the support member;
    a pair of clamping straps capable of engaging one another around the elongate members and the support member; and
    means for securely tensioning said pair of clamping straps around the elongate members and the support member.

12. The clamp assembly of claim 11, wherein said receptacle has a recess therein corresponding to the number of elongate members, each said recess adapted to at least partially receive one of the elongate members.

13. The clamp assembly of claim 11, wherein said pair of support straps and said pair of clamping straps are flexible members.

14. The clamp assembly of claim 11, wherein said means for securely tensioning comprises a pivotable buckle attached to one of said pair of clamping straps.

15. The clamp assembly of claim 11, further comprising an adjustment assembly attached to one of said pair of clamping straps.

16. The clamp assembly of claim 15, wherein said adjustment assembly comprises:

an elastomeric adjuster attached to one of said pair of clamping straps; and an adjustment patch attached to said elastomeric adjuster, said adjustment patch capable of matingly engagingly one of said pair of clamping straps.

17. The clamp assembly of claim 11, wherein said pair of support straps and said pair of clamping straps engage with hook and loop type fasteners.

18. The clamp assembly of claim 11, wherein said receptacle includes a receptacle body made of high density polyurethane foam.

19. The clamp assembly of claim 11, wherein said pair of clamping straps are connected to one of said pair of support straps.

20. The clamp assembly of claim 11, further comprising a pair of fins extending outwardly from said receptacle.

* * * * *